April 15, 1941.　　　　M. G. IVANDICK　　　　2,238,647
CONSTANT VELOCITY UNIVERSAL JOINT
Filed Dec. 20, 1939　　　　2 Sheets-Sheet 1
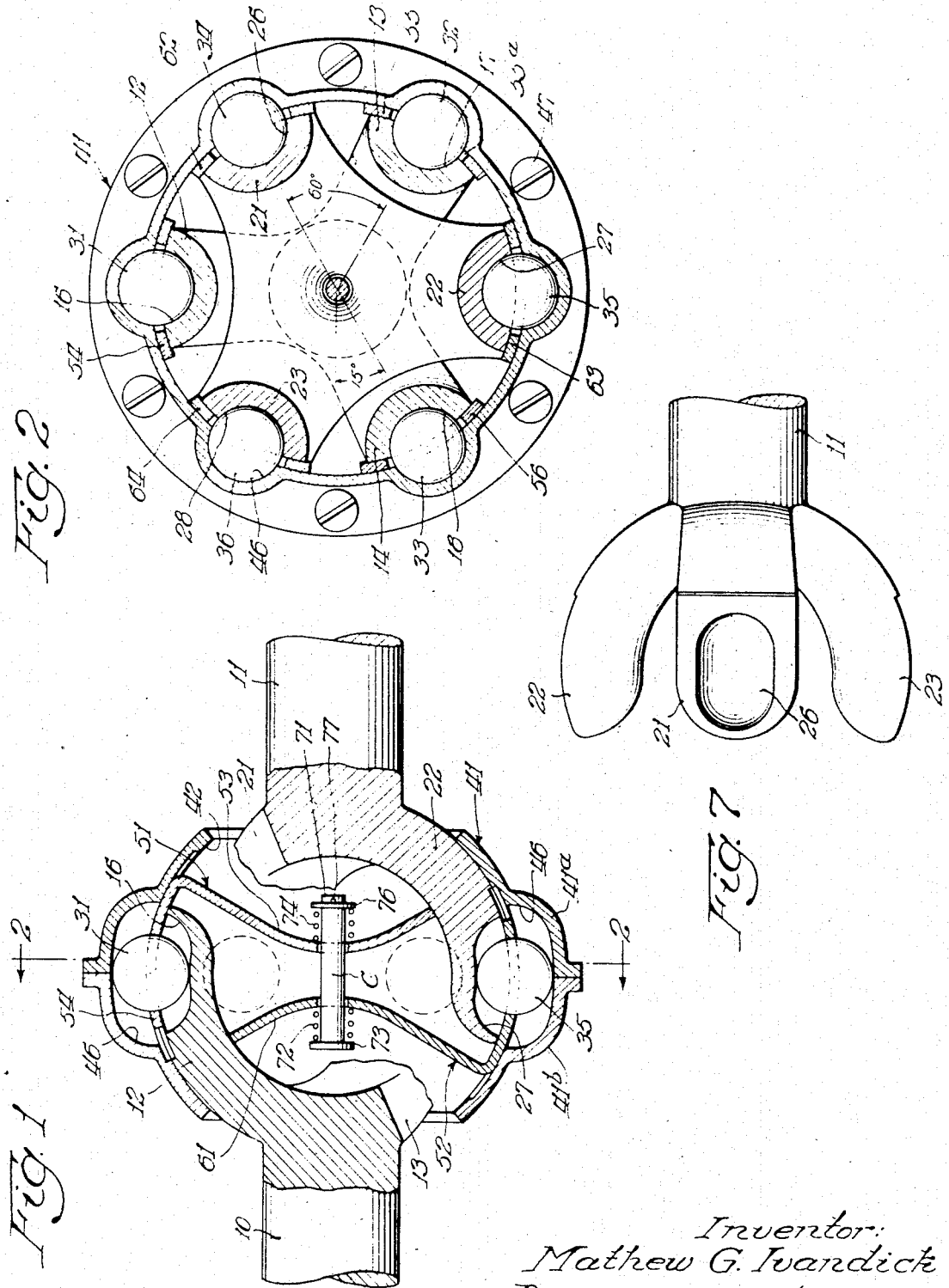
Inventor:
Mathew G. Ivandick
By Edward P. Fitzbaugh
Atty.

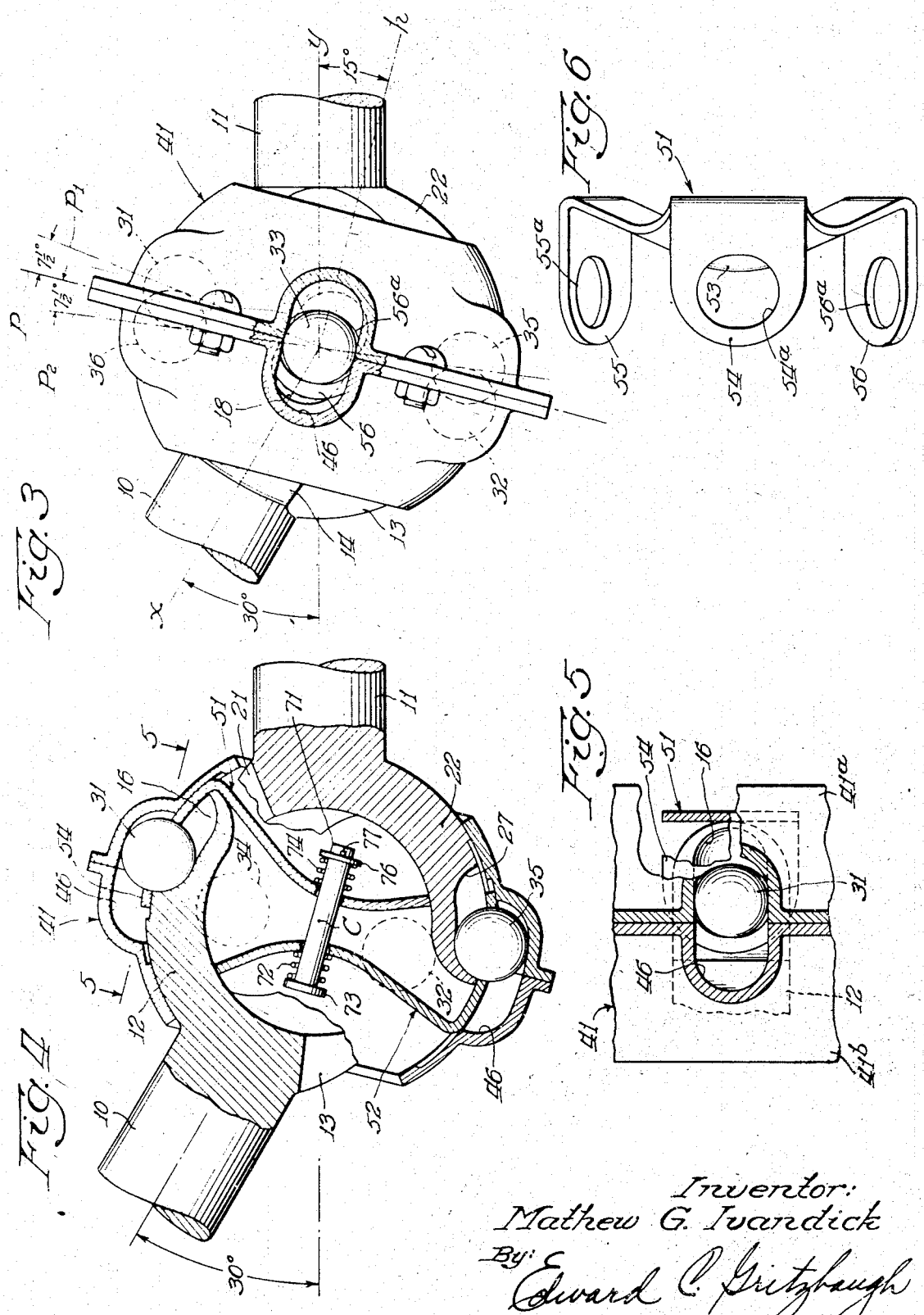

Patented Apr. 15, 1941

2,238,647

UNITED STATES PATENT OFFICE 2,238,647

CONSTANT VELOCITY UNIVERSAL JOINT

Mathew G. Ivandick, Belvidere, Ill., assignor to Borg-Warner Corporation, Chicago, Ill., a corporation of Illinois Application December 20, 1939, Serial No. 310,095

4 Claims. (Cl. 64—21)

This invention relates to universal joints of the constant velocity type.

I am aware that universal joints have been proposed heretofore wherein there is provided anti-friction means between the yoke-like driving and driven members purporting to be automatically adjustable for the purpose of controlling the moment arm relationship to cause the driven member to turn at the same velocity as the driving member.

It is the broad object of this invention to provide an improved construction for accomplishing the above including a novel arrangement of anti-friction connecting means between the driving and driven members of a universal joint affording a relatively large angular capacity while maintaining a constant velocity ratio between said driving and driven members.

It is a more specific object to provide in a joint of the above type, an improved construction of driving and driven members for cooperating with anti-friction balls and with an improved means for transmitting torque between the balls of the respective members.

It is a more detailed object to effect economy in the manufacture of a joint of the above type by making the driving and driven members identical; by providing a housing drivingly connecting all of the balls, which housing is susceptible of being formed by a simple stamping operation; and by otherwise reducing the cost of manufacture.

The above and other objects and advantages of my invention will become more apparent from a reading of the following specification and claims taken in connection with the appended drawings which form a part of this specification and wherein:

Fig. 1 is an axial cross-section view of a preferred embodiment of my invention;

Fig. 2 is a transverse section taken substantially on the line 2—2 of Fig. 1;

Fig. 3 is a side elevation partially in section with the axes of the driving and driven members inclined at an angle of thirty degrees and the joint rotated 15 degrees in a counterclockwise direction looking from left to right in Fig. 4 and showing in partial section the manner in which the raceways intersect one another to define the position of the interposed balls;

Fig. 4 is an axial cross-section view corresponding to Fig. 3;

Fig. 5 is a plan view partly in section taken substantially on the line 5—5 of Fig. 4;

Fig. 6 is a side elevation of one of the ball cages; and

Fig. 7 is a side elevation of one of the yoke-like members.

Referring in greater detail to the figures of the drawings, the preferred embodiment illustrated comprises a yoke-like driving member indicated generally at 10 and a yoke-like driven member indicated generally at 11, these members being connected in driving relation and for relative angular movement by a special arrangement of means forming the subject matter of the present invention. It will be apparent that while, for the purpose of description, one of these members is referred to as the "driving" and the other as the "driven" member, this relationship is interchangeable, these members being identical in shape and operation. Also, while driving member 10 and driven member 11 are shown as terminating in the form of a solid shaft, it will be apparent that these terminal portions can as readily be in the form of sockets in accordance with conventional practice in universal joints. Driving member 10 is formed with three forks or finger-like diverging portions 12, 13 and 14. In the outer periphery of these fingers, there are formed meridian grooves or ball races 16, 17 and 18, these races being arcuate in shape and generated about a center C located on the axis of the driving member 10. These races extend generally in an axial direction, and are positioned 120 degrees apart about the axis $x$ of driving member 10.

Driven member 11 is identical in shape to the driving member, being formed with diverging fork or finger-like portions 21, 22 and 23 formed in the outer periphery thereof with meridian grooves or ball races 26, 27 and 28 respectively. These races are likewise disposed 120 degrees apart. The driving member fingers and the driven member fingers are telescoped in a manner to position all of the meridian races in a generally parallel relation with successive or adjacent races separated by 60 degrees as indicated in Fig. 2.

Received in races 16, 17 and 18 are balls 31, 32 and 33, while balls 34, 35 and 36 are received in races 26, 27 and 28 respectively.

For the purpose of transmitting torque from the balls 31, 32 and 33 in the meridian races 16, 17 and 18 of the driving member to the balls 34, 35 and 36 in the meridian races 26, 27 and 28 of the driven member, there is provided a novel housing construction indicated generally at 41. This housing has a generally spherical shaped inner periphery 42 for embracing cooperation with the spherical exterior of the finger-like portions of both the driving and driven members and is further provided with a plurality of meridian grooves or races 46 on the inner periphery thereof corresponding in number, shape and location to the meridian races formed on the outer periphery of the driving and driven fingers. This housing 41 is formed by a simple stamping operation which results in considerable economy of manufacture, being made in two parts 41a and 41b fastened together by suitable means such as bolts 47. This stamping of the meridian grooves 46, as well as the subsequent grinding of the inner surfaces thereof is greatly facilitated by the fabrication of the housing in the two half sections. The added advantage of this construction in assembly will also be apparent.

A pair of cages 51 and 52 serve to partially control the positions of the balls associated with the fingers of the driving and driven members respectively as will appear. Cage 51 comprises a generally concave web portion 53 from which there extends three spherical shaped wing portions 54, 55 and 56. These wings are spherical in shape for cooperation with the spherical exterior of the fingers 12, 13 and 14 and the spherical inner portion of the housing 41, and formed with orifices 54a, 55a and 56a embracingly receiving the associated ball. These orifices are preferably made elongated in a peripheral direction in order to prevent binding when the yoke members are moved at an angle relative to one another. Cage 52 is identical to cage 51 except that it cooperates with fingers 21, 22 and 23. This cage comprises concave web portion 61 and spherical shaped wings 62, 63 and 64 cooperating with the spherical exterior of fingers 21, 22 and 23 of driven member 11 and the spherical interior of housing 41.

To further assure the proper cooperation of the cages with the associated spherical surfaces, these cages are resiliently fastened together at their central portions. As shown, this fastening means comprises a pin 71 having a coil spring 72 interposed between the head 73 and the cage 52 and a second coil spring 74 interposed between cage 51 and retaining washer 76 held in place by pin 77.

I have discovered that with the above structure, if the axis $x$ of driving member 10 is moved at a given angle to the axis of the driven shaft $y$ and the driving shaft is then rotated, the driven shaft will be rotated at the same velocity as the driving shaft.

This operation is based on the following requisite conditions which are found to be satisfied in a joint constructed as above described.

When the axis $x$ meets the axis $y$ at an angle, and the joint is rotated at least four pair of the juxtaposed meridian grooves located in the housing 41 and in the fingers of the driving and driven members will always be out of parallel relation. These out of parallel or intersecting meridian races define definite positions of the balls confined therebetween, relative to the axis $h$ of the housing and the respective axis $x$ or $y$ as the case may be. Specifically, it is found that at least two of the balls 31, 32 and 33 will be maintained in a plane that bisects the angle between the axis $x$ and the axis $h$ of the housing 41 and likewise at least two of balls, 34, 35 and 36 will be maintained in a plane that bisects the angle between the axis $y$ and the axis $h$ of the housing 41.

This can best be understood by an examination of the relations pictured in Figs. 3 and 4 wherein axis $x$ is disposed at 30 degrees to axis $y$. It is noted that Fig. 4 corresponds to Figs. 1 and 2 as regards degree of rotation of the joint and this will be referred to as the 0 angle of rotation. In Fig. 3, on the other hand, the joint has been rotated 15 degrees in a counterclockwise direction looking from left to right in order to more clearly show the intersecting relation between the juxtaposed meridian races. For the purpose of simplifying the description, the housing 41 is shown with its axis $h$ disposed at equal angles of 15 degrees to axes $x$ and $y$. Referring first to driving member 10, it will be found that meridian races 17 and 18 are out of parallel with the opposed races 46 in housing 41, thus defining a very definite position for balls 32 and 33 (the relationship of meridian race 18, meridian race 46, and ball 33 being shown in partial section in Fig. 3). This position of the balls is found to always be in the plane that bisects the angle between the axis $x$ and the axis $h$ of the housing. In the particular position shown in Fig. 4, the assembly has been rotated back from the position of Fig. 3, 15 degrees in a clockwise direction looking from left to right, in which latter position the ball 31 associated with driving finger 12 and the ball 35 associated with driven finger 22, lie between opposed parallel races and but for the cages 51 and 52 might during the instant that this relation exists, get out of the plane and cause the joint to lock. The positions of the respective cages are determined by the positions of the associated pairs of balls confined between intersecting races. With the housing as shown in Fig. 3, the balls 31, 32 and 33 will be maintained in a plane $P_1$ inclined 7½ degrees to the median plane P of the housing 41 and the balls 34, 35 and 36 will be maintained in a plane $P_2$ inclined 7½ degrees in the other direction relative to plane P.

Still another advantage is the fact that in my arrangement there is effected a considerable reduction in friction as compared with previously known arrangements. Specifically, in changing the axes $x$ and $y$ from the relation shown in Fig. 1 to an angular relation such as that shown in Figs. 3 and 4, there will be less friction encountered because there are fewer balls in each yoke member and because there are two sets of balls instead of one about which movement can start in effecting angular adjustment of the axes.

It is to be additionally noted that my arrangement eliminates the need for an independent pilot member such as is usually employed in three axes constant velocity universal joint, this function being performed for the friction means of each yoke member by means of the above described intersecting relation between the opposed meridian grooves.

While I have described my invention in connection with one specific embodiment thereof, it is to be understood that this is by way of illustration and not by way of limitation and that the scope of my invention is to be defined by the appended claims which should be construed as broadly as the prior art will permit.

I claim:

1. In a universal joint, a driving member comprising diverging finger-like portions having a spherical outer periphery, an embracing housing having a spherical inner periphery complementary to the outer periphery of said diverging portions, friction reducing means interposed between said diverging portions and said housing for transmitting torque therebetween, a driven member comprising diverging portions having a spherical outer periphery likewise cooperating with the spherical inner periphery of said housing and friction reducing means interposed between the diverging portions of said driven member and said housing for transmitting torque therebetween.

2. In a constant velocity universal joint, a driving yoke-like member comprising three diverging finger-like portions having a spherical outer periphery each being formed with a generally axially extending meridian groove in said outer periphery, an embracing housing having a spherical inner periphery complementary to the outer periphery of said diverging finger portions and internally formed with a plurality of meridian grooves corresponding in number and disposition to said grooves on said fingers, a plurality of balls one received between each of said opposed pairs of grooves for transmitting torque therebetween, a driven yoke-like member identical to said driving member and comprising diverging finger-like portions having a spherical outer periphery and likewise provided with generally axially extending meridian grooves, said housing being also formed with opposed meridian grooves for cooperation with said driven member grooves, and a plurality of balls one disposed between each of said last named opposed grooves, angular movement between the axis of said driving yoke and the axis of said driven yoke being effective to cause at least two of the opposed pairs of grooves of both the driving and driven members to move out of parallel relation to one another and into an intersecting relation thus defining definite positions for the balls confined therebetween, said positions being in planes which bisect the angles between the axes of the members and the axis of said housing.

3. In a constant velocity universal joint, a driving member comprising three diverging fingers each having a generally axially extending meridian groove formed in the outer periphery thereof, said grooves being 120 degrees apart, a driven member identical in form to said driving member positioned with the fingers thereof between the fingers of said driving member and spaced 60 degrees therefrom respectively, an embracing housing received about the adjacent portions of said fingers, said housing being formed with internal meridian grooves corresponding in number and disposition to said meridian grooves on both of said driving and driven members and a plurality of balls, one received in each of said meridian grooves, for transmitting torque from the fingers of the driving member to said embracing housing and from said housing to the fingers of said driven member, said meridian groove and ball arrangement providing for angular adjustment between said shafts while maintaining the velocity of said driving and driven members the same.

4. In a constant velocity universal joint, a driving yoke-like member comprising three diverging generally axially extending finger-like portions having a spherical outer periphery and each of said fingers being formed in the outer periphery thereof with a generally axially extending meridian groove, a driven yoke-like member comprising three diverging generally axially extending finger-like portions having a spherical outer periphery, each of said driven member fingers being formed in the outer periphery thereof with a generally axially extending meridian groove, a plurality of balls, one received in each of said meridian grooves, an embracing housing received about said finger-like portions and having a spherical inner periphery complementary to the outer periphery of said diverging fingers, said housing being formed internally with a plurality of internal meridian grooves corresponding to said meridian grooves on both of said driving and driven members, said meridian grooves all lying in a generally parallel relationship when the axis of said driving yoke coincides with the axis of said driven yoke, a pair of identical ball cages, one associated with the fingers of said driving member and one associated with the fingers of said driven member, each of said cages comprising a central hub-like portion and three wing-like portions, each of said wing-like portions being spherical in shape for cooperation between the spherical outer periphery of the associated finger and the spherical inner periphery of the housing and being further perforated for embracing and receiving the associated ball therebetween, angular movement between the axis of either yoke and the axis of said housing being effective to cause at least two of the meridian grooves associated with the fingers of said axis to intersect the associated housing grooves and thus define positions for the interposed balls, said cage being adjusted in position by virtue of the positions of said balls and being effective in the event that the remaining ball is confined between parallel grooves to determine the position thereof.

MATHEW G. IVANDICK.